(12) United States Patent
Sung

(10) Patent No.: US 6,763,110 B1
(45) Date of Patent: Jul. 13, 2004

(54) SOUND GUIDE FOR SPEAKER AND HANDSET FOR MOBILE COMMUNICATION USING THE SAME

(75) Inventor: Young Hwan Sung, Kyongsangnam-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/417,695

(22) Filed: Oct. 13, 1999

(30) Foreign Application Priority Data

Dec. 18, 1998 (KR) ........................................ 1998-25549

(51) Int. Cl.[7] ............................................... H04M 1/00
(52) U.S. Cl. ................................................. 379/433.02
(58) Field of Search ................................ 379/433, 430, 379/433.03, 433.01, 433.02, 433.13, 433.08; 455/90, 575; 381/71.7; 455/575.1, 90.3

(56) References Cited

U.S. PATENT DOCUMENTS

| | | | |
|---|---|---|---|
| 4,163,875 A | | 8/1979 | Cogan ........................ 179/103 |
| 4,675,903 A | * | 6/1987 | Gulezian et al. ....... 379/433.03 |
| 4,782,527 A | * | 11/1988 | Williamson et al. ........ 379/433 |
| 4,926,474 A | * | 5/1990 | Marks .................... 379/433.01 |
| 5,081,674 A | | 1/1992 | Wijas et al. ................ 379/43.3 |
| 5,265,158 A | * | 11/1993 | Tattari .................... 379/433.08 |
| 5,732,143 A | * | 3/1998 | Andrea et al. ............. 381/71.7 |
| 5,963,640 A | * | 10/1999 | Rabe ..................... 379/433.02 |
| 6,002,949 A | * | 12/1999 | Hawker et al. ......... 379/433.02 |
| 6,151,486 A | * | 11/2000 | Holshouser et al. ... 379/433.13 |

* cited by examiner

*Primary Examiner*—Jack Chiang
(74) *Attorney, Agent, or Firm*—Fleshner & Kim, LLP

(57) ABSTRACT

A sound guide for a speaker is capable of guiding a sound of a desired volume to a desired position regardless of installation structure of the speaker. The sound guide for a speaker includes a speaker support for supporting the speaker in a case, and a sound guide groove formed in an inner side of the speaker support, for guiding the direction of the audible signal of the speaker at a predetermined angle. The sound propagation groove has one side coupled with the speaker and other side coupled with a sound propagation hole which is formed in the case. A handset for mobile communication using the sound guide includes a case having a speaker therein, and a sound propagation hole for propagating the audible signal generated by the speaker to outside, wherein the speaker is slanted at a predetermined angle with respect to a front side of the case. Preferably, the sound guide is mounted in an upper side of the speaker to guide the audible signal to the sound propagation hole by directing the audible signal at a predetermined angle.

29 Claims, 4 Drawing Sheets

SOUND GUIDE FOR SPEAKER AND HANDSET FOR MOBILE COMMUNICATION USING THE SAME

BACKGROUND OF THE INVENTION

1. Field of the Invention

The present invention relates to a mobile communication handset, and more particularly to a speaker installed in a handset for mobile communication.

2. Background of the Related Art

Generally, a speaker used for various electronic products converts an inaudible electrical voice signal to an audible signal. Small sized electronic products such as electronic pocket books, organizers and handsets for mobile communications (e.g., cellular phones and personal communication service (PCS) phones) require a relatively small sized overall product and a relatively large sized display, such as a liquid crystal display (LCD), to show various information to a user. To achieve this sizing, various suggestions, such as miniaturization of various components used for electronic products and variations in arrangement of the components, have been advanced.

The speaker, however, has properties such that the distance between the speaker and the ears of the user, as well as extremely fine vibrations and space structure of the speaker can vary the sound quality. For such reasons, it was difficult to reduce the size of the speaker used for small sized electronic products beyond a certain limit. It was also detrimental to change the installation position and/or structure of the speaker.

Accordingly, a related art speaker is formed in a case of the electronic product parallel and close to a sound propagation hole, which propagates an audible signal generated by the speaker to the outside. An example of the related art speaker for a handset for mobile communication will be described with reference to FIGS. 1 and 2.

Referring to FIG. 1, an LCD 20 for displaying characters is provided in a main body, i.e., a case 2 of a handset 1. A sound propagation hole 15 is formed in an upper side of the case 2, above the LCD 20, to propagate the sound generated by a speaker 10, which is provided inside the case 2. A microphone 12 and a flip 3 are provided in a lower side of the case 2.

Referring to FIG. 2, at the rear of the sound propagation hole 15 formed in a front side 2a of the case 2, the speaker 10 is provided parallel to the front side 2a of the case 2. A filter 50 is provided between the sound propagation hole 15 and the speaker 10 so as to prevent any foreign substance, such as dust, from getting into the speaker 10. The filter 50 is attached to an inner side of the case 2 by a first piece of double-sided adhesive tape 40, and attached to the speaker 10 by a second piece of double-sided adhesive tape 45.

The operation of the related art speaker for the handset will now be described. If an electrical signal reaches the handset 1, the electrical voice signal is converted to an audible signal by the speaker 10. The audible signal remains in the case 2 for a while due to resistance and then is propagated to an ear of the user through the filter 50 and the sound propagation hole 15. The filter 50 prevents any foreign substance from adhering to the speaker, and prevents deterioration of the speaker's 10 performance.

The related art handset has various problems. Recent trends in handset design have sought to reduce the handset's overall length in order to facilitate carrying and custody. By contrast, it is desirable that the size of the LCD become larger as data communication using a mobile communication system has increased. However, the extent to which the related art handset for a mobile communication can meet such requirements is limited. That is, since the related art speaker 10 is attached parallel to the front side 2a of the handset 1, the portion of the handset where the speaker 10 is mounted necessarily occupies a length greater than a diameter D of the speaker. This limits the extent to which the handset length can be reduced. Furthermore, since the speaker 10 occupies a relatively large space in the handset having a limited size, the amount of space available to the LCD 20 is reduced.

Such problems cannot be solved by simply varying the installation position and structure of the speaker. As aforementioned, since the speaker has properties that vary the sound depending on the distance between the speaker and the user's ear, as well as on the extremely fine vibration and space structure of the speaker, the volume or articulation of the sound may be deteriorated if any variation is made to only the installation position or structure of the speaker.

The above references are incorporated by reference herein where appropriate for appropriate teachings of additional or alternative details, features and/or technical background.

SUMMARY OF THE INVENTION

An object of the present invention is to provide a handset for a mobile communication device that substantially obviates one or more of the disadvantages of the related art.

Another object of the present invention is to provide a handset for a mobile communication capable of reducing the size of the handset and allowing an LCD to become larger.

Another object of the present invention is to provide a handset for a mobile communication device having a speaker situated such that the diameter of the speaker does not affect the overall length of the handset while maintaining a desirable sound quality.

Another object of the present invention is to provide a sound guide for a speaker, capable of guiding a sound of a desired volume to a desired position regardless of installation structure of the speaker, and a handset for mobile communication using the sound guide.

To achieve at least the above objects in whole or in part, there is provided a sound guide for a speaker according to the present invention including a speaker support for supporting the speaker which is provided in a case thereof and converts an electrical signal to an audible signal; and a sound guide groove formed in an inner side of the speaker support, for converting advance direction of the audible signal of the speaker at a predetermined angle, the sound propagation groove having one side communicated with the speaker and other side communicated with a sound propagation hole which is formed in the case. Preferably, the sound guide groove has a semicircular shaped curved surface with small reflection of the sound and is made of a rubber material.

Additionally, to achieve at least the above objects in whole or in part, there is further provided a handset for a mobile communication system including a case having a speaker therein and a sound propagation hole for propagating the audible signal generated by the speaker to outside, wherein the speaker is slanted at a predetermined angle with respect to a front side of the case. Preferably, a sound guide is mounted in one side of the speaker to guide the audible signal to the sound propagation hole by converting the audible signal at a predetermined angle.

In order to achieve at least the above-described objects of the present invention in a whole or in parts, there is provided a communications handset, including a case having a sound propagation hole, a speaker coupled to the case which generates audible sounds, wherein the speaker is positioned at a first prescribed angle other than 0° or 180° with respect to a front side of the case, and the sound propagation hole allows the audible sounds to be heard outside of the case.

To further achieve the above-described objects of the present invention in a whole or in parts, where is provided a sound guide for a speaker including a speaker support for coupling to the speaker and a sound guide recess formed in an inner portion of the speaker support to guide the propagation direction of sound waves emitted form the speaker in a first direction, wherein the sound guide recess has a first side for substantially aligning with the speaker and a second side aligned in a second direction that is substantially perpendicular to the first direction.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
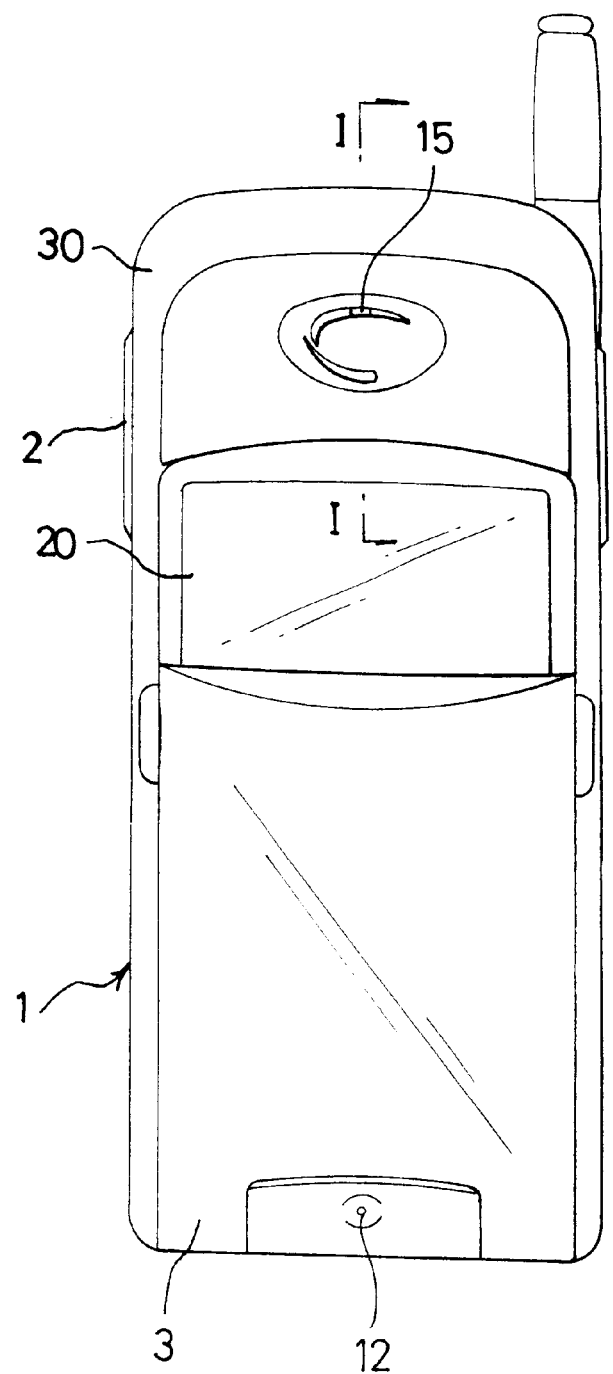
FIG. 1 is a drawing showing a front view of a related art handset for mobile communication.
Figure 2:
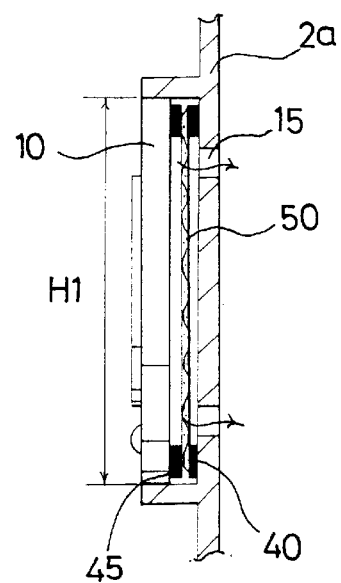
FIG. 2 is a sectional view taken along line I—I of FIG. 1.
Figure 3:
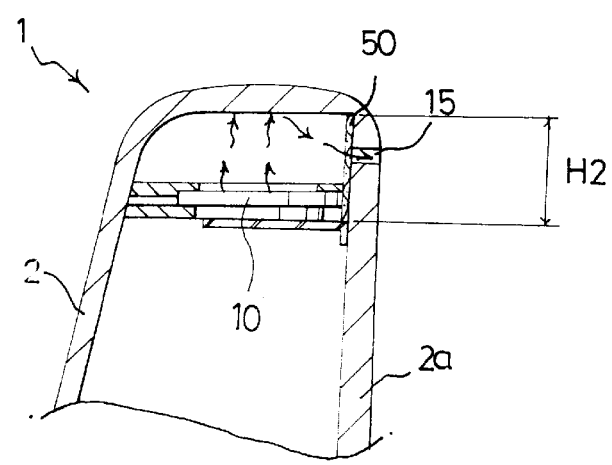
FIG. 3 is a sectional view illustrating a handset for mobile communication according to one embodiment of the present invention.
Figure 4:
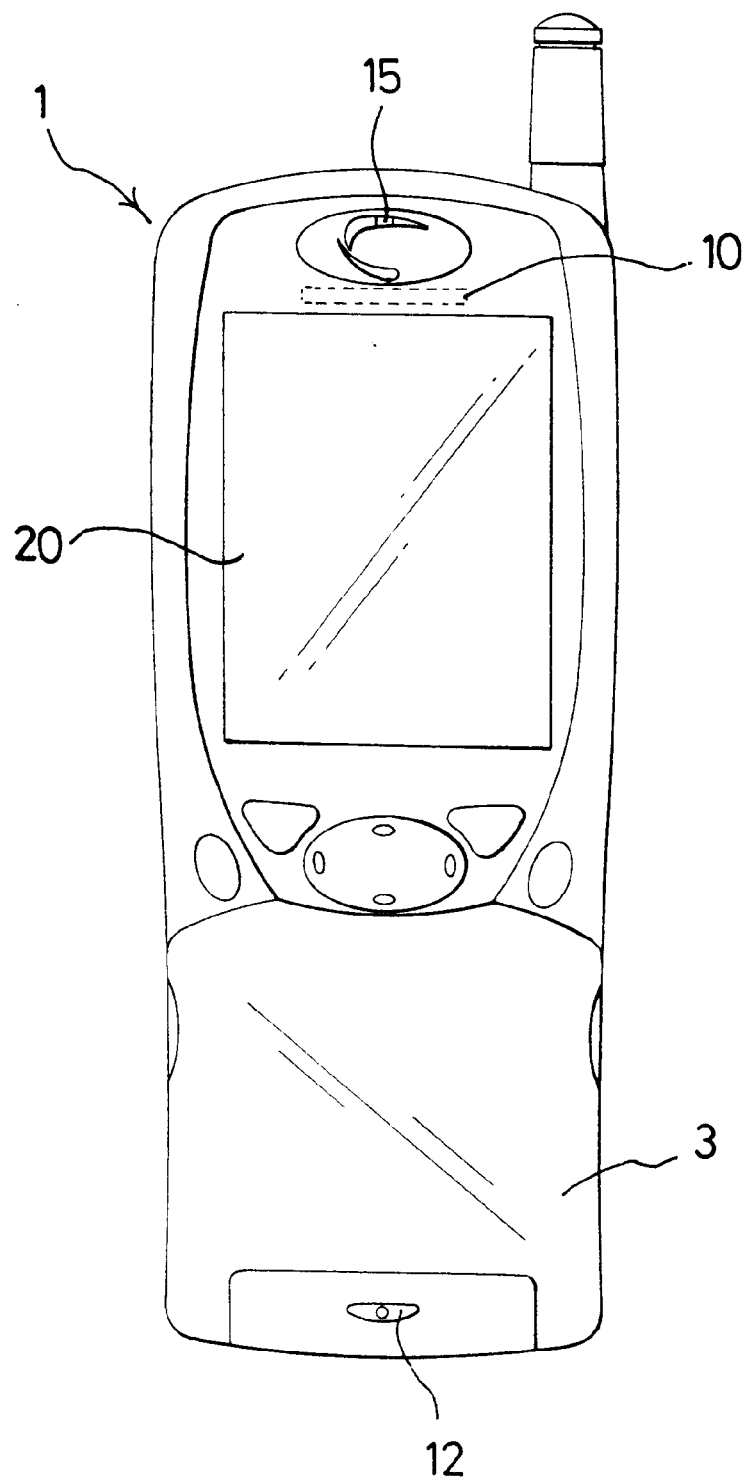
FIG. 4 is a drawing showing a front view of a handset for mobile communication.

A sound guide according to one embodiment of the present invention and a handset for mobile communication using the sound guide will be described with reference to FIGS. 3 and 4. FIG. 3 is a sectional view illustrating a handset for mobile communication according to one embodiment of the present invention, and FIG. 4 is a front view of the device of FIG. 3.

The handset for mobile communication according to a preferred embodiment of the present invention preferably includes an LCD 20 in a front side 2a of the handset 1. A sound propagation hole 15 is formed in the upper side of the LCD 20 to propagate the sound generated by the speaker 10 to the ear of a user. Additionally, a filter 50 for filtering any foreign substance is provided in an inner side of the sound propagation hole 15.

In this embodiment of the present invention, the speaker 10 is preferably mounted at a predetermined angle, preferably about 90° with respect to the front side 2a of the case 2. This arrangement enables the length H2 between the speaker 10 and the upper side of the handset 1 to be reduced, thereby reducing the overall length of the handset and allowing the size of the LCD 20 to be increased. This embodiment has the disadvantage of the sound from the speaker 10 being propagated upwardly and thus failing to advance if the upper side of handset is blocked. Alternatively, the sound is reflected and is finally propagated to the outside of the handset through the sound propagation hole 15. In this case, however, the volume and articulation of the sound are deteriorated.

Figure 5:
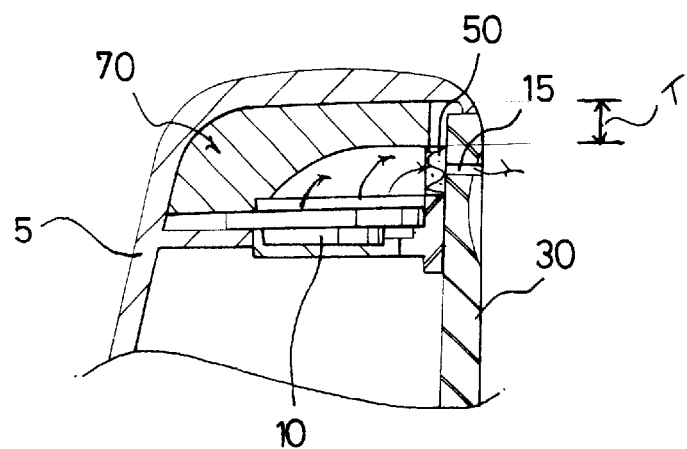
FIG. 5 is a sectional view illustrating a handset for mobile communication according to one embodiment of the present invention.

Referring to FIG. 5, a sound guide 70 is preferably provided above the upper side of the speaker 10. The sound guide 70 serves to steer the direction of the sound generated by the speaker 10 at a prescribed angle toward the sound propagation hole 15 so as to prevent deterioration of the volume and articulation of the sound.

Figure 6:
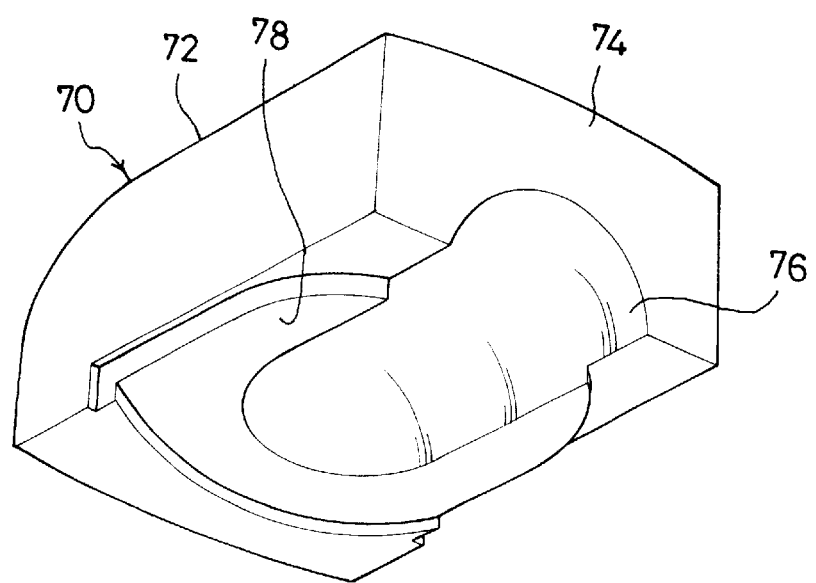
FIG. 6 is a perspective view illustrating the sound guide of FIG. 5.

Referring to FIG. 6, the sound guide 70 will be described in detail. A speaker support 78, on which the upper side of the speaker 10 is mounted, is formed in the bottom of the sound guide 70. A sound guide groove 76 is formed in an inner portion of the speaker support 78 to guide the sound generated by the speaker 10 to the sound propagation hole 15, preferably without any loss. For this purpose, the sound guide groove 76 has one side coupled to receive an output of the speaker 10, and the other side coupled to the sound propagation hole 15.

An upper side 72 of the sound guide 70 may have various shapes, but preferably has the same shape as the inner side of the case 2 in which the sound guide 70 is mounted, so as to be closely adhered to the case 2. Also, it is preferable that a front side 74 of the sound guide 70 be formed to be closely adhered in the sound propagation hole 15.

The conversion angle of the sound can be adjusted depending on an angle of the sound guide groove 76. The sound guide groove 76 should be formed without a cornered portion which could prevent the sound from advancing. The thickness T between the sound guide groove 76 and the upper side 72 of the sound guide 70 should be such that vibration does not occur. Accordingly, it is preferable that the sound guide groove 76 be a semicircular shaped curved surface having minimum sound reflection, and be made of a rubber material capable of closely adhering to the inside of the handset. It is also preferable that the thickness between the sound guide groove 76 and the upper side 72 of the sound guide 70 be formed of a prescribed thickness so as not to generate vibration.

Furthermore, since the size of the sound guide groove 76 affects the sound's volume, it is possible to obtain the sound of desired volume by appropriately adjusting the size of the sound guide groove 76.

The operation of the handset for mobile communication according to a preferred embodiment of the present invention will be described with reference to FIG. 5. When an electrical voice signal reaches the handset 1, the electrical voice signal is converted to an audible signal by the speaker 10. The audible signal (the sound) advances toward the upper side of the speaker 10. At this time, the sound is guided toward the sound propagation hole 15 by the sound guide groove 76 of the sound guide 70, which also minimizes sound reflection.

For example, if the speaker 10 is mounted perpendicular to the front side 2a of the case 2, the sound is also converted by about 90°. As the sound generated by the speaker 10 moves along the curved surface of the sound guide groove 76, resistance is small, and loss of the sound is reduced. Further, since the upper side 72 and the front side 74 of the sound guide 70 have the same shape as the inner side of the case 2 in which the sound guide 70 is mounted, the sound generated by the speaker 10 does not leak out. Therefore, the sound generated by speaker 10 is propagated to the outside, that is, to the ear of the user, without degradation in the volume or articulation of the sound.

The aforementioned embodiments of the present invention have at least the following advantages. First, the sound guide allows the sound to be guided toward a desired direction, regardless of installation structure and angle of the speaker, and also minimizes loss of the sound.

Second, according to a preferred embodiment of the handset for a mobile communication of the present invention, since the speaker is mounted at a predetermined angle with respect to the front side of the case to minimize the height of the speaker, it is possible to reduce the length of the handset and provide a larger LCD for the handset. Furthermore, if the sound guide conforms to the handset, it is possible to propagate the sound to the outside without deteriorating the volume and articulation of the sound.

While the aforementioned embodiment of the present invention has been described in relation to a handset for mobile communication, the present invention is not limited to such an application. For example, the sound guide according to the present invention can be used with any small sized electronic product having a speaker, such as an earphone, an electronic pocket book, a computer, or a mini-recorder, so that the speaker can be installed at a desired position in a small space. Therefore, the sound guide according to the present invention can permit miniaturization of such electronic products having the speaker, and if applicable extension of the LCD or other surface.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile communication terminal handset, comprising:
a rigid single body case having a sound propagation hole on a front side forming an opening on the case;
means for providing wireless communication;
a speaker coupled to the case configured to generate audible sounds;
a sound chamber between the speaker and the sound propagation hole, wherein the speaker is positioned at a first prescribed angle other than 0° and 180° with respect to the front side of the case, wherein a first side of the sound chamber is formed along a portion of the first side of the case that contains the sound propagation hole, and second side of the sound chamber is aligned with the speaker, and wherein the sound propagation hole allows audible sounds from the speaker to pass directly from the sound chamber to outside of the case;
a sound guide within the sound chamber, wherein the sound guide is configured to guide the audible sounds generated by the speaker toward the sound propagation hole by directing a propagation direction of the audible signal at a second prescribed angle.

2. The handset of claim 1, wherein the first prescribed angle is approximately 90°.

3. The handset of claim 1, wherein the sound guide comprises:

a speaker support coupled to the speaker; and
a sound guide groove formed in the sound guide between an inner portion of the speaker support and an inner portion of the front side of the case, and configured to convert the propagation direction of the audible signal to the second prescribed angle, wherein the sound guide groove has a first side in close proximity to the speaker and a second side in close proximity to the sound propagation hole.

4. The handset of claim 3, wherein the sound guide groove is formed of a single body and has a semicircular shaped curved inner surface which provides minimal reflection of the sound.

5. The handset of claim 1, wherein the sound guide is made of a rubber material.

6. A sound guide for a speaker, comprising:
a speaker support coupled to the speaker; and
a sound guide recess formed in an inner portion of the speaker support to guide the propagation direction of sound waves emitted from the speaker in a first direction to a second direction, wherein the sound guide recess has a first side substantially aligned with the speaker and a second side aligned in a second direction that is substantially perpendicular to the first direction, wherein the second side is configured to couple to a front side of a single body mobile communication terminal, and wherein the first side is contiguous with the second side wherein the sound guide groove has a semicircular shaped curve which minimnizes the reflection of the sound.

7. The sound guide of claim 6, wherein the sound guide is formed of a single body and comprises a rubber material.

8. The handset of claim 1, wherein an outer portion of the sound guide substantially conforms to an inner portion of the case.

9. The handset of claim 3, wherein the sound guide is configured such that substantially all of the sound from the speaker is directed into the sound guide groove.

10. The sound guide of claim 6, wherein the sound guide is configured to conform to an inner shape of a case of the mobile communication terminal, and the second side of the sound guide groove is aligned with the front side of the case.

11. The sound guide of claim 6, wherein the sound waves from the speaker propagate out of the sound propagation hole with substantially the same phase and amplitude as the sound waves emitted from the speaker, and the sound waves are not substantially reflected within the sound guide.

12. The handset of claim 1, further comprising a filter coupled between the sound propagation hole and the speaker.

13. The handset of claim 1, wherein the sound propagation hole comprises an opening in the case between an inside of the case and an outside of the case.

14. The handset of claim 1, further comprising a LCD display panel, wherein the speaker is positioned between the LCD display panel and the sound propagation hole.

15. The handset of claim 1, wherein the speaker is coupled to a speaker support, and wherein the speaker support is coupled to the front side of the case.

16. The handset of claim 1, wherein the speaker is affixed to a speaker support that is affixed to the front side of the case such that the speaker is substantially adjacent to the sound propagation hole.

17. The handset of claim 3, wherein the sound guide groove is formed to commence at the speaker and terminate at the sound propagation hole.

18. The handset of claim 4, wherein an outer surface of the sound guide is molded to have a shape of the sound chamber.

19. The handset of claim 18, wherein the sound guide is configured to minimize vibration of the case.

20. The handset of claim 5, wherein the sound guide is formed from a single piece of the rubber material.

21. The sound guide of claim 6, wherein the sound guide is enclosed within a rigid body of a mobile communication device and is positioned in a location between a LCD display screen of the mobile communication device and a top of the mobile communication device.

22. The sound guide of claim 6, wherein the sound guide is formed within a sound chamber positioned between the speaker and a sound propagation hole.

23. The sound guide of claim 6, wherein the second direction is aligned with a sound propagation hole formed in the front side of the mobile communication terminal, such that the sound waves propagate out of the mobile communication terminal.

24. The sound guide of claim 11, wherein the speaker is positioned adjacent to the sound propagation hole.

25. A mobile communication terminal, comprising:
- a rigid single body case having a sound propagation hole on a front side;
- means for providing wireless communications;
- a LCD display on the front side of the single body case, configured to display user information;
- a speaker coupled to the single body case at an angle other than 0° and 180° relative to the front side of the single body case, wherein the speaker is coupled to a speaker support adjacent to the sound propagation hole, and wherein a first side of a sound chamber is formed along a portion of the front side of the single body case that contains the sound propagation hole, and second side of the sound chamber is aligned with the speaker and wherein and the sound propagation hole allows audible sounds from the speaker to be heard outside of the case; and
- a sound guide within the sound chamber, wherein the sound guide is configured to guide the audible sounds generated by the speaker toward the sound propagation hole by directing a propagation direction of the audible signal at a second prescribed angle.

26. The mobile communication terminal of claim 25, wherein the sound guide comprises:
- a speaker support coupled to the speaker; and
- a sound guide groove formed in the sound guide between an inner portion of the speaker support and an inner portion of the front side of the case, and configured to convert the propagation direction of the audible signal to the second prescribed angle, wherein the sound guide groove has a first side in close proximity to the speaker and a second side in close proximity to the sound propagation hole.

27. The mobile communication terminal of claim 26, wherein the sound guide groove is formed of a single body and has a semicircular shaped curved inner surface which provides minimal reflection of the sound.

28. The method of claim 1, wherein the speaker is proximally located adjacent to the sound propagation hole.

29. The method of claim 25, wherein the first side of the sound chamber is contiguous to the second side of the sound chamber.

* * * * *